(12) United States Patent
Perez et al.

(10) Patent No.: US 9,855,698 B2
(45) Date of Patent: Jan. 2, 2018

(54) AUTOMATIC PROCESS CONTROL OF ADDITIVE MANUFACTURING DEVICE

(71) Applicant: Massachusetts Institute of Technology, Cambridge, MA (US)

(72) Inventors: Alfonso Alexander Perez, West Palm Beach, FL (US); Christopher Michael Haid, Bolton, MA (US); Mateo Pena Doll, Elk, CA (US); Forrest W. Pieper, Nederland, CO (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 550 days.

(21) Appl. No.: 14/448,229

(22) Filed: Jul. 31, 2014

(65) Prior Publication Data
US 2015/0045928 A1    Feb. 12, 2015

Related U.S. Application Data

(60) Provisional application No. 61/863,110, filed on Aug. 7, 2013.

(51) Int. Cl.
*G06F 19/00* (2011.01)
*B29C 47/10* (2006.01)
(Continued)

(52) U.S. Cl.
CPC ...... *B29C 47/1045* (2013.01); *B29C 47/0002* (2013.01); *B29C 47/0014* (2013.01); *B29C 47/0806* (2013.01); *B29C 47/0866* (2013.01); *B29C 47/862* (2013.01); *B29C 47/92* (2013.01); *B29C 64/106* (2017.08); *B29C 64/112* (2017.08); *G05B 19/41875* (2013.01);
(Continued)

(58) Field of Classification Search
CPC .................................................. B29C 47/1045
USPC .................................................. 700/95–212
See application file for complete search history.

(56) References Cited

U.S. PATENT DOCUMENTS 5,231,585 A * 7/1993 Kobayashi ....... G05B 19/41865
                                                            700/112
5,262,954 A * 11/1993 Fujino ................ G05B 19/4183
                                                            700/112
(Continued)

FOREIGN PATENT DOCUMENTS

EP         0581445 A1    2/1994
WO    2009/134298 A2   11/2009

OTHER PUBLICATIONS

Wong, Kaufui V., and Aldo Hernandez. "A review of additive manufacturing." ISRN Mechanical Engineering 2012 (2012). pp. 1-11.*

(Continued)

*Primary Examiner* — Satish Rampuria
(74) *Attorney, Agent, or Firm* — Gesmer Updegrove LLP

(57) ABSTRACT

Automatic process control of additive manufacturing. The system includes an additive manufacturing device for making an object and a local network computer controlling the device. At least one camera is provided with a view of a manufacturing volume of the device to generate network accessible images of the object. The computer is programmed to stop the manufacturing process when the object is defective based en the images of the object.

17 Claims, 5 Drawing Sheets

(51) Int. Cl.
| | |
|---|---|
| *G05B 19/418* | (2006.01) |
| *B29C 47/00* | (2006.01) |
| *B29C 47/08* | (2006.01) |
| *B29C 47/86* | (2006.01) |
| *B29C 47/92* | (2006.01) |
| *B29C 64/106* | (2017.01) |
| *B29C 64/112* | (2017.01) |
| *B33Y 30/00* | (2015.01) |

(52) U.S. Cl.
CPC  *B29C 2947/926* (2013.01); *B29C 2947/9258* (2013.01); *B29C 2947/92571* (2013.01); *B29C 2947/92904* (2013.01); *B33Y 30/00* (2014.12); *G05B 2219/32222* (2013.01); *Y02P 90/14* (2015.11); *Y02P 90/18* (2015.11); *Y02P 90/265* (2015.11)

(56) References Cited

U.S. PATENT DOCUMENTS

| | | | | |
|---|---|---|---|---|
| 5,475,695 | A * | 12/1995 | Caywood | G01R 31/318307 700/108 |
| 5,561,770 | A * | 10/1996 | de Bruijn | G01R 31/318385 700/17 |
| 5,661,648 | A * | 8/1997 | Georgitsis | B42C 9/0031 700/117 |
| 6,266,436 | B1 * | 7/2001 | Bett | G06T 7/004 382/111 |
| 8,422,797 | B2 | 4/2013 | Heisele | |
| 2003/0067496 | A1 * | 4/2003 | Tasker | H01J 37/28 715/846 |
| 2004/0059450 | A1 * | 3/2004 | Hill | G06T 17/10 700/98 |
| 2005/0113961 | A1 * | 5/2005 | Sabol | A61B 5/055 700/182 |
| 2012/0105903 | A1 * | 5/2012 | Pettis | G06F 3/12 358/1.14 |

OTHER PUBLICATIONS

Hu, Dongming, and Radovan Kovacevic. "Sensing, modeling and control for laser-based additive manufacturing." International Journal of Machine Tools and Manufacture 43.1 (2003): pp. 51-60.*

Vaezi, Mohammad, Hermann Seitz, and Shoufeng Yang. "A review on 3D micro-additive manufacturing technologies." The International Journal of Advanced Manufacturing Technology 67.5-8 (2013): pp. 1721-1754.*

Kusiak, Andrew, and Gerd Finke. "Selection of process plans in automated manufacturing systems." IEEE Journal on Robotics and Automation 4.4 (1988): pp. 397-402.*

Caudell, Thomas P., and David W. Mizell. "Augmented reality: An application of heads-up display technology to manual manufacturing processes." System Sciences, 1992. Proceedings of the Twen. pp. 659-669.*

Jammes, François, and Harm Smit. "Service-oriented paradigms in industrial automation." IEEE Transactions on Industrial Informatics 1.1 (2005): pp. 62-70.*

Transmittal of the International Search Report and the Written Opinion for PCT/US2014/049670 dated Nov. 3, 2014.

Mark Rehorst, "First test of nut drive extruder," Feb. 2, 2014.

Transmittal of the International Search Report and the Written Opinion for PCT/US2014/049563 dated Oct. 31, 2014.

Ren C. Luo et al, "Desktop Rapid Prototyping System With Supervisory Control and Monitoring Through Internet", Dec. 1, 2001 vol. 6, No. 4, IEEE Service Center, Piscataway, NJ, US.

Hoelzle D J et al, "Iterative Learning Control for robotic deposition using machine vision", Jun. 11, 2008, pp. 4541-4547, IEEE Service Center, Piscataway, NJ, US.

Examination report No. 3 for standard patent application 2014306218 dated May 5, 2017.

Notification of requisition by examiner for Application No. 2,919,508 dated May 26, 2017.

\* cited by examiner

AUTOMATIC PROCESS CONTROL OF ADDITIVE MANUFACTURING DEVICE

This application claims priority to provisional application Ser. No. 61/863,110 filed Aug. 7, 2013, the contents of which are incorporated herein by reference.

BACKGROUND OF THE INVENTION

This invention relates to general additive manufacturing devices such as 3-D printers which may utilize a variety of technologies, including extrusion deposition, granular melting and sintering, powder bed and binder, and light polymerisation. The system is particularly suited for, but not limited to, devices that are automated such that a finished job can be removed from the printing volume and the next job started without any manual human actions.

Conventional additive manufacturing devices require a toolchain with numerous different software applications for various steps in the process. All process feedback such as dimensional accuracy and surface finish must be measured and evaluated manually, with no systematic way of integrating this feedback to improve system function.

Efficiently operating an additive manufacturing device to produce objects that meet designer-specified tolerances involves minimizing machine time per job, operator time, material consumption and overall machine downtime in order to maximize throughput and limit material and personnel cost. An ideal system would operate around the clock and only produce objects within the specified tolerances without requiring a human operator.

In reality, a variety of issues result in failed jobs, objects that do not meet tolerance requirements, and unnecessary machine downtime. Manually controlling these issues, especially on low-cost additive manufacturing devices, requires a significant amount of operator time to pre-inspect parts, input various machine parameters to meet specified tolerance requirements, monitor the job manually, remove the object after completion, measure the object to test adherence to specified tolerance requirements, and iteratively repeat the process until the object meets the specified requirements.

SUMMARY OF THE INVENTION

The disclosed invention minimizes the number of tools an operator must use to control an additive manufacturing device by providing a single unified interface for inspecting potential jobs, monitoring jobs remotely in real-time, and gathering and evaluating process feedback during and after a job. In addition, the system uses modern computer vision and machine learning algorithms to automate the process of identifying and correcting system errors and inaccuracies, providing tolerance control without requiring operator input.

The disclosed system increases the efficiency of operating an additive manufacturing device by automatically minimizing factors contributing to cost. Machine learning algorithms correlate the input CAD (Computer Aided Design) file with machine parameters to predict the properties of the manufactured object and the time necessary to manufacture it. Computer vision algorithms or an integrated 3D scanner evaluate the object after manufacturing to ensure tolerance requirements are met and to provide feedback to the machine learning algorithms so that the predictions improve over time. Thus the system gradually improves its ability to set machine parameters that maximize likelihood of meeting specified tolerances while minimizing manufacturing time. This minimizes both the time per job and the number of iterations required to meet specifications. Minimizing iterations limits wasted material consumption and increases overall throughput of the device.

The system can perform various calibration routines automatically using computer vision techniques. Temperature calibration for a given material involves printing a test object at varying temperatures and selecting the object with the best bed adhesion, surface finish, and dimensional accuracy. Images of a calibration pattern printed onto the plate provide information on bed levelness and nozzle height. Part removal characteristics such as the optimal z-height for aligning the blade with the printing surface are optimized using computer vision. Part adhesion can be estimated from the amount of current drawn by the motor powering the removal blade.

The system tracks material consumption and automatically notifies material suppliers when to ship new material before scheduling a planned downtime for an operator to replace the material cartridge. This prevents the operator from replacing the material cartridge at a non-optimal time; too early means usable material may be wasted, and too late means unnecessary machine downtime.

The system monitors jobs in real-time using computer vision algorithms to detect failures at the earliest point possible. Rather than waiting until a job is finished to measure and inspect the part, the system can detect that a job is unlikely to meet specifications early in the process. The job can be terminated early and either restarted or skipped to avoid wasting additional material and machine time.

The system provides a single interface for an operator to add jobs to the queue, input specifications and tolerances, inspect CAD files, and provide additional manual monitoring if desired. The interface includes 3D print preview, which incorporates a CAD file and proposed machine parameters to visualize the predicted output of the additive manufacturing device. 3D print preview allows the operator to adjust a multitude of specifications and get predictive feedback in realtime of how those adjustments will affect the printed object. 3D print preview can also detect and annotate features of a CAD model that are likely to result in errors.

The invention also includes a novel 3D scanning method that allows non-disruptive scanning to be integrated into a 3D printer. An array of individually-controlled lights shining on the object creates shadows that are imaged and measured to verify dimensional accuracy.

The system according to the invention for automated process control of an additive manufacturing device includes an additive manufacturing device such as a 3-D printer for making an object and a local networked computer controlling the device. At least one camera is provided with a view of a manufacturing volume of the device to generate network accessible images of the object. The computer is programmed to stop the manufacturing process when the object is defective based on the images of the object.

In a preferred embodiment, the at least one camera has a fixed view of the manufacturing volume. Alternatively, the camera may have a robotically controlled view of the manufacturing volume. The images may be video streams or static images. A preferred additive manufacturing device is a 3-D printer. In another preferred embodiment, the computer further includes a series of server-side applications executing remote algorithms. A web browser based control interface may be provided. The algorithms may include machine learning algorithms such as Markov, Bayesian inference or artificial neural network algorithms.

Another preferred embodiment includes 3-D print preview to update object rendering in real time. The system may further include an array of lights for creating object shadows for reconstructing a profile view from the point of view of each light. The "lights" referred to above should be understood to include any source that emits electromagnetic radiation such as infrared, ultraviolet, radio, x-ray and gamma, etc.

DESCRIPTION OF THE PREFERRED EMBODIMENT

Since desktop 3D printers are not completely reliable, fairly robust error detection and correction is necessary for true automation. This patent application discusses several software and hardware techniques to further automate and optimize the 3D printing process.

Automated Process Control involves building a computational model of the 3D printing process. The goal is to optimally select printing parameters based on the CAD file and dimensional and structural specifications and tolerances. The model is continuously improved by automatically and/or manually evaluating resulting outputs to provide feedback to the computational model.

Input features are gathered from both the CAD file and user-specified parameters. The CAD file is analyzed to determine relevant characteristics such as cross-sectional area along any closed surface or layer, contact area and perimeter with the printing surface, wall thickness, required support material, and angles of supported features. The user may specify dimensional tolerances and strength requirements along a multitude of axes and surface finish requirements for designated faces.

These input features are used to estimate the optimal slicing parameters. Slicing parameters include information such as printing surface and nozzle temperature, rotational orientation, layer height, maximum speeds and accelerations for each axis, and infill patterns and densities. Once the settings are determined, the CAD file is sliced and sent to the printer.

Figure 1A:
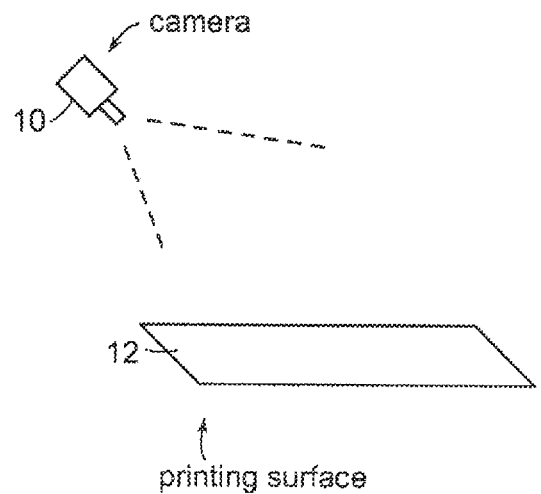
FIGS. 1a and 1b are perspective views of an embodiment of the invention including a camera viewing a printing surface within a manufacturing volume of an additive manufacturing device.
Figure 1B:
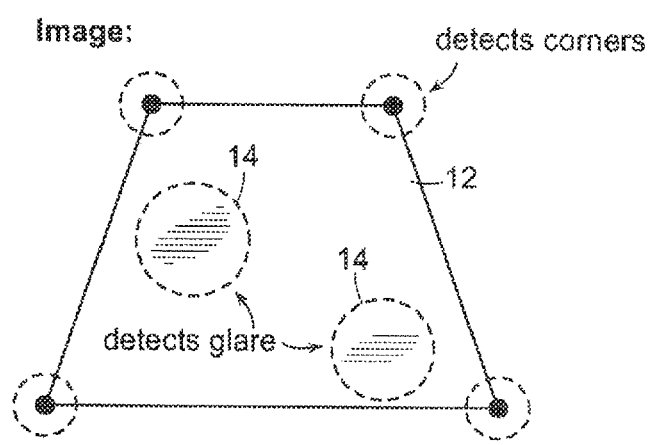

During printing, computer vision algorithms monitor for failures. In FIG. 1a, a camera 10 is located for viewing a printing surface 12. Corners of the printing surface 12 are determined and defects show up as glare regions 14 as shown in FIG. 1b.

The algorithms are tuned to predict the cause of the error. For example, if an error is detected very early in the print there is likely an issue with the levelness or coating of the printing surface. If the error is sudden and drastic later on in the print, it is likely that the part became detached from the printing surface and the cause of failure is poor bed adhesion and/or warping.

After printing, the system gathers a variety of outputs. Dimensional accuracy and surface finish are estimated from a 3D scan of the object provided by the integrated 3D scanner. Print surface adhesion can be estimated from the amount of power drawn by the motor powering the removal system.

All of the information gathered can be used as feedback for the computational model. Over time, various failure modes will become associated with corresponding slicing parameters. For example, poor bed adhesion is likely caused by incorrect temperature settings or printing orientation. Failure to meet dimensional tolerances is likely caused by incorrect acceleration, speed, or layer height. The machine learning algorithm determines the degree of correlation between each input and each failure mode.

The system maintains a print queue for upcoming jobs, and each job includes metadata such as the amount of filament consumed and an estimated print time. Additionally, the system tracks the amount and type of filament for each printer.

Before shipping to the customer, the material supplier can perform various quality control and calibration processes on a given material cartridge. For example, the supplier measures the precise filament diameter and runs a calibration routine to determine the optimal printing temperatures for both the nozzle and printing surface. The cartridge is tagged with a unique ID number, which is entered into a web interface along with the corresponding calibration information. By having the material supplier perform these steps, calibration can be done on a per-batch basis. This is much more efficient than having the end user calibrate for each material cartridge. It minimizes variability from an assumed mean value, resulting in much higher accuracy than assuming that batches will have the same properties.

The system stores the active cartridge ID for each printer, as well as calibration and remaining material information for each cartridge ID. Whenever a user wishes to replace the material in the printer, she must first input the new cartridge ID. The system will update the corresponding printer's active material and re-slice objects in the queue based on the calibration information associated with that material cartridge ID. After each print job (successful or failed) the system updates the amount of material remaining for the relevant material id.

Whenever a new job is added to the printing queue, the system checks if there will be enough remaining material for the job to complete. If there is an insufficient amount of material remaining, the system will schedule a material replacement and notify the operator. Later, if another job is submitted that requires less material such that it can be completed before the material replacement, the system will automatically move the new job ahead in the queue.

The system performs these material checks as each part is added to the queue. This means that rather than detecting insufficient material supplies immediately before each print starts, the system detects such shortages well in advance. This allows for a variety of optimizations. Smaller jobs that require less material can be moved up in the queue to avoid wasting material at the end of a cartridge. Material replacement can be scheduled far in advance, allowing operators to plan their schedules around the replacement.

The system maintains an average rate of material consumption for each printer. This combined with information about the supplier and shipment lead time allows the system to automatically order replacement material and have it arrive just in time. This avoids issues associated with getting replacement material at the wrong time: too early and the unused material may degrade before being used, too late and there may be unnecessary machine down-time while waiting for material to arrive.

Note that users may change material even before the current active material is running low, for example if they require a different color or material type. The old cartridge can be re-installed at a later time. In fact, an old cartridge could even be installed on a different printer connected to the system. This is possible because the system stores remaining material information on a per-cartridge basis, not per-printer.

One-way mirrors can be used to facilitate a stable lighting environment for computer vision algorithms. Allowing light to exit the printing volume but not to enter it means that operators will still be able to observe the machine, but that external lighting conditions will not affect the accuracy of the computer vision algorithms. Internal lighting conditions are stable and can be integrated into the scenes used to generate renders as shown in FIG. 2 that will be compared to images. Controlling for varying external lighting conditions with one-way glass will improve the accuracy and consistency of the computer vision algorithms.

Figure 2A:
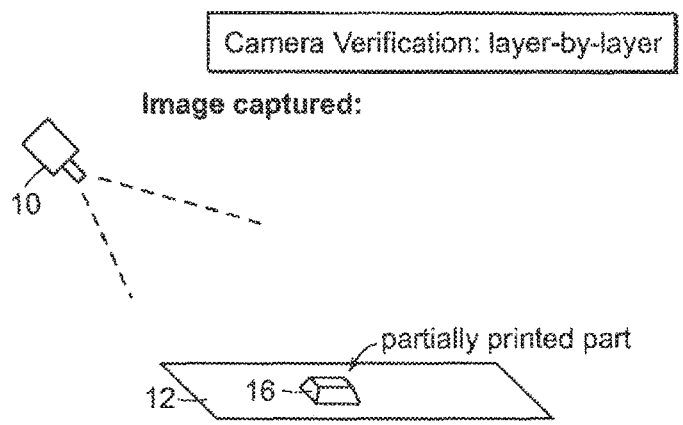
FIGS. 2a and 2b are perspective views of an embodiment of the invention showing layer by layer verification along with the comparison of an image with a render.
Figure 2B:
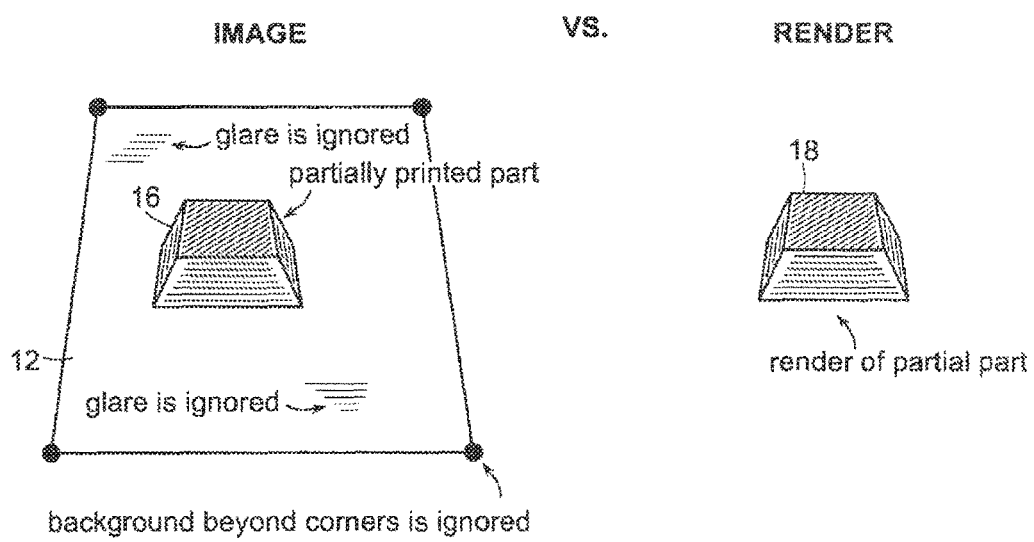

FIGS. 2a and 2b illustrate layer-by-layer camera verification. As shown in FIG. 2a a partially printed part 16 is compared with a render of the partial part 18. If the partially printed part 16 differs beyond a selected threshold from the render 18, the part 16 is defective and the system should shut down so that the partially printed part 16 may be removed and discarded.

Fully automated 3D printers utilize some form of automated part removal to clear the printing surface between prints. A computer vision algorithm is used to verify that the removal was successful and that the printing surface is clean enough for the next print to begin. The process consists of a calibration routine, techniques to compensate for varying lighting environments, and a print surface clearness verification routine. See FIGS. 1a and 1b.

Calibration is a manual process involving a human operator. The operator first confirms that the print surface is completely clear. The system then moves the surface to the home position and captures a reference image. Next an edge detection or other computer vision algorithm is used to identify the corners of the printing surface in order to determine which pixels in the reference picture represent the print surface. The human operator verifies or corrects this print surface isolation. See FIGS. 2a and 2b.

Next the operator cycles through various lighting conditions the printer may encounter. This includes turning on and off lights, opening and closing window shades, and testing during both day and night time. For every possible combination of lighting conditions, the human operator signals to the computer system to capture a glare calibration image with the print surface in the home position. The webcam and/or external sensors on the printer measure ambient lighting conditions associated with each glare calibration image. This concludes the calibration process.

After an attempted removal, the system performs the print surface clearness verification routine. First the printer measures the ambient lighting conditions to determine the current most likely lighting conditions. It uses these conditions to select which glare calibration image to use for glare reduction. Next the printer moves the print surface into the home position and captures a verification image. Glare reduction techniques such as feature recognition or thresholding remove as much of the glare as possible from the verification image. Finally, edge detection algorithms are run on the glare-reduced verification image. If no edges are detected within the print surface then the printer is notified that the print volume is clear so it may begin the next print. If edges are detected, the printer is notified to run the removal routine again. If the system detects a failed removal multiple times in a row, the operator is notified to inspect the system and manually remove the part.

Layer-by-layer verification is used to detect errors during the printing process. If an error is detected, the system can cancel and remove the failed print before either retrying the job or moving to the next job in the queue. Layer-by-layer verification consists of a calibration routine, an augmented slicing routine, and a per-layer verification routine.

The calibration routine identifies the boundaries of the print surface depending on its height (the z-height) and distance from the camera. First a human operator must verify that the surface is clear. Next the printer moves to a variety of z-heights and captures a calibration image that is associated with that z-height. For each calibration image, the corners of the print surface are identified either automatically by an edge detection algorithm or manually by a human operator.

Layer-by-layer verification requires a specialized slicing technique. Rather than only generating g-code for every layer, the slicer must also generate a predictive render of what the part will look like after each layer is printed. This takes into account not only the shape of the partially printed objects, but also other slicing parameters such as layer height and infill pattern and density. These renders are adjusted to accommodate material shrinkage based on the material being used and the ambient and printing temperatures. This information is combined with the calibration image of the print surface at the appropriate z-height and distance from the camera to generate a render of what the print should look like after each layer is printed.

The per-layer verification routine requires a technique to capture images after every layer of a 3D print. This could include a custom g-code inserted into the g-code file for the print at the end of each layer. When the firmware executes this custom g-code it signals to the webcam to capture a layer verification image. The print can continue uninterrupted while a remote or local server processes the layer verification image. Only if the verification process detects a variation from the acceptable tolerances will the print be cancelled.

Once the layer verification image is captured and sent to the remote or local server, the system compares the verification image with the predictive render associated with the current z-height from the slicing routine. This verification involves edge detection, feature recognition, and other computer vision techniques to determine how close the current print is to the predicted render. If the difference between the image and the render is below a threshold value the print may proceed. Otherwise the print job is cancelled and removed, after which the print job can either be attempted again (potentially with adjusted parameters) or skipped so the next job on the queue can be printed.

The verification algorithm compares not only the shape of the part, but also it's position relative to the printing surface. This allows the system to detect when parts become either partially or completely detached from the printing surface. This is a common failure mode that cannot be recovered from without restarting the job, and can potentially cause damage to the printer if the failed job is not terminated.

Detecting shadows is very useful for detecting failures, particularly when the material is a very similar color to the printing surface or background. The lighting conditions of the printer are included in the scene used to generate renders, so shadows are present in both the render and the image. Comparing these shadows provides additional data on if the print is succeeding.

Figure 3A:
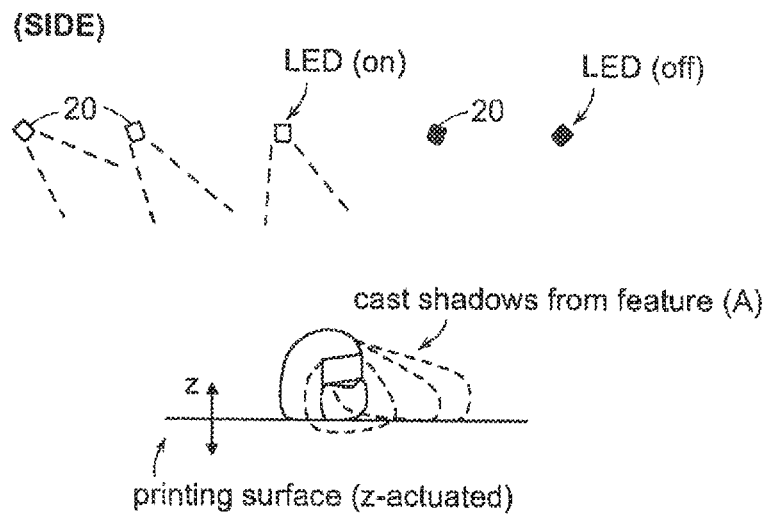
FIGS. 3a and 3b are side and top views, respectively, of an embodiment of the invention utilizing an array of lights to cast shadows from an object being printed.
Figure 3B:
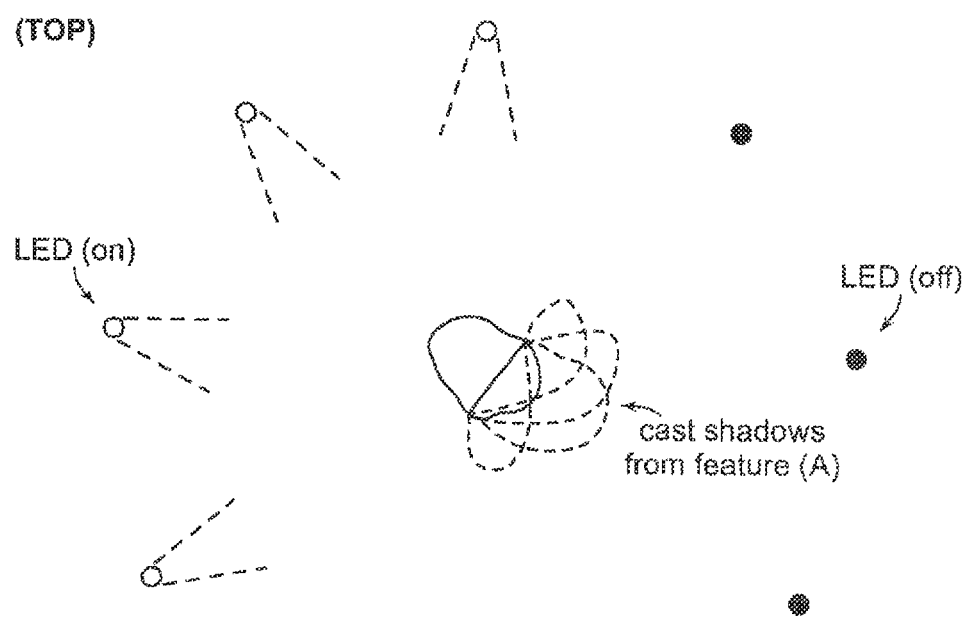

With reference now to FIGS. 3a and 3b, lights 20 form an array of lights. The lights 20 may be light emitting diodes. As shown in FIGS. 3a and 3b, the lights cast shadows from the feature A being observed.

In order to improve the ability of the algorithm to predict if a print has failed, users can annotate which frame of a time lapse generated from the layer verification images as the point of failure. All previous images can be used as negative training examples (no errors) and all subsequent images can be used as positive training examples (error) for an error detecting classification algorithm.

Layer-by-layer verification also enables automatic printer self-preservation. Some failed prints potentially result in the printer damaging itself, for example by crashing the print head after the motor skips or by getting stray material stuck in components such as belts, pulleys, and bearings. By detecting failures in-process, the machine is much less likely to continue a failed print long enough to cause serious damage.

To facilitate continuous improvement of the entire 3D printing process, the system uses a combination of computer vision and machine learning techniques to evaluate prints and improve parameter optimization for the slicing process. This involves various relevant inputs to the slicing software and features of the model being printed, as well as relevant features of both successful and unsuccessful prints. The system evaluates the features of the 3D model to select the inputs for the slicing software, and then evaluates either 2D images or 3D scans of the printed part to provide feedback. Over time, the system will learn how to best optimize the slicer settings in order to produce high-quality prints.

Features of 3D models may include cross sectional area at various heights, print surface contact area, user-annotated force vectors, wall thickness, user-specified print time requirements, and other relevant features. Slicer parameters may include layer height, infill pattern and density, extrusion width, printing temperatures, and various other parameters of the slicing software. Feedback from models may include metrics such as dimensional accuracy, surface finish, measured print time, and user-supplied strength ratings.

3D scanning and/or computer vision are used to verify the quality of the part. This allows an operator to print a part and know that it will meet specifications. The system uses a 3D scan and/or computer vision algorithms to compare the outer surface of the completed or partially completed part to the CAD model and specifications. If a job does not meet specifications, it can automatically be resubmitted, optionally with altered settings to increase the likelihood of compliance with specifications. The operator no longer needs to iteratively set parameters, print, and measure the part, since the system performs all steps of this process automatically.

A variety of machine learning algorithms may be suitable to map these features and develop a model for 3D printing slicer parameters. These include hidden markov models, bayesian inference, and artificial neural network algorithms.

Part evaluation can be performed on a layer-by-layer basis. This allows the system to verify tolerances on internal features that may not be visible when the print has finished. All of the techniques from this section can be integrated into the layer-by-layer routine to provide in-process feedback to the machine learning algorithms.

When new feedback causes drastic changes to the model, old slicing paramters may no longer be optimal. The system can detect such drastic changes and re-slice parts waiting in a queue to take advantage of the updated model. If the system learns from one or more printers that adjusting a certain parameter greatly improves quality of a related feature, other printers can use this information to re-slice queued parts based on the improved model.

There are many tools available to view and manipulate 3D models, both in the cloud through the browser and with locally installed software. However, none of these tools provide direct feedback on how various slicing settings will affect the object being printed. Our system includes 3D print preview, which gives users real-time visual feedback of how input settings will affect the printed shape.

3D print preview incorporates relevant context attributes to generate accurate real-time renderings of a potential 3D print. For example, the system selects the color of the print preview based on the color of filament currently loaded into the user's printer. Additionally, the object is rendered within a to-scale representation of the print volume.

3D print preview updates the rendering in real time as users adjust print settings. For example, when a user adjusts the speed vs. quality setting the system adjusts the layer height used to print the object. The render of the object includes a representation of the layer height, which is adjusted in real time as the user adjusts the speed vs. quality slider. Since layer height is very small relative to the size of most parts, anti-aliasing techniques are necessary to avoid unwanted artifacts in the render.

Unlike toolpath visualization tools which require complex pre-processing on a model before rendering, 3D print preview generates a computationally-efficient visualization of the model. Even the fastest pre-processors (aka slicers) can take 10-20 seconds to generate a toolpath from an average sized file. These preprocessors must run again after every parameter update. 3D print preview loads quickly in the user's web browser and responds in real-time to sliders that control key printing parameters before slicing the CAD file.

Conventional 3D scanners generally require rotation of a laser and camera relative to the object being scanned. Integrating this rotation with a cartesian 3D printer to make a dual 3D printer/scanner can be difficult. We propose a system with a small number of standard webcams and an array of lights to generate 3D scans without moving the camera relative to the object.

FIGS. 3a and 3b illustrate a suitable array of lights to gather 2-D projections from the object being printed.

The system uses the array of lights to gather 2D projections (shadows) of the object from various angles. The lights must emit a spectral range that is within what the cameras can detect, but this range may or may not fall within the visible spectrum. The lights are turned on one at a time or in specific groups and an image of the object is gathered with each webcam. The shadow of the object can be used to reconstruct a profile view from the point of view of each light. Several of these profile views can be used to reconstruct a 3D model of the object.

The system can be improved by using a printing surface with a precise grid to provide reference points for the computer vision algorithm. Additionally, the system can align axes with specified dimensional tolerances with one or more lights to guarantee that the relevant dimension can be measured. Finally, the system can move the printing surface along the z axis or move the webcam in order to get necessary views.

The difference between scanning an arbitrary object and checking if a manufactured part meets specifications is subtle but important. Since the system knows what the object should look like, it can predict what shadows a particular light combination will create, then verify if those shadows appear as expected. This is a much simpler process than attempting to generate an entire 3D model from a small selection of profile views.

This technique could potentially be optimized by using multi-color lights or lights with different wavelengths. If the camera can accurately identify any possible combination of lights, a single image can be used for the above process. Camera filters can be used to isolate a specific spectrum. Based on the color measured at each pixel of the image, the system would determine which lights are shining on that point unobstructed. This would result again in a series of shadows from each light view, which can be used to generate profile views and in turn a reconstructed 3D model of the object.

Figure 4:
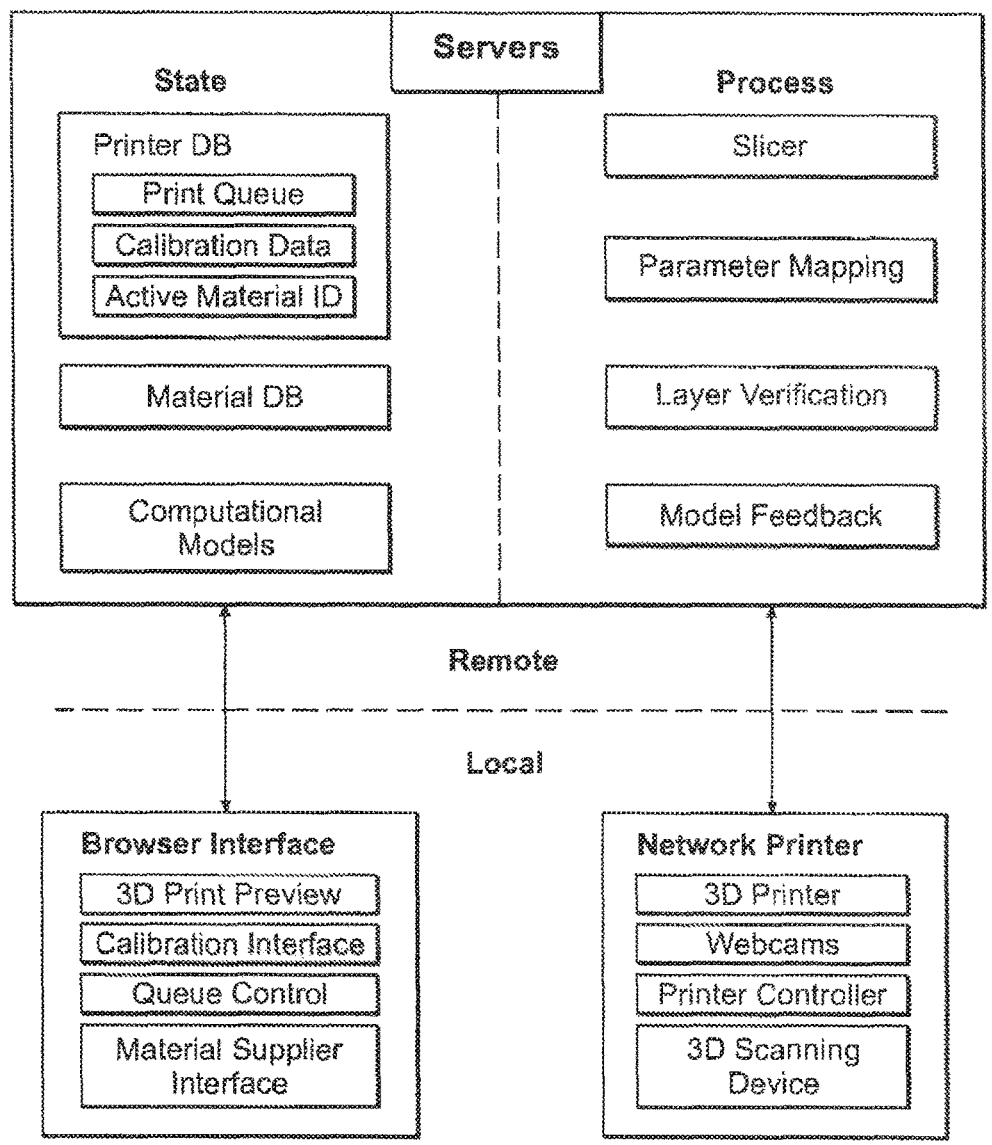
FIG. 4 is an overall system diagram showing system operation.
Figure 5:
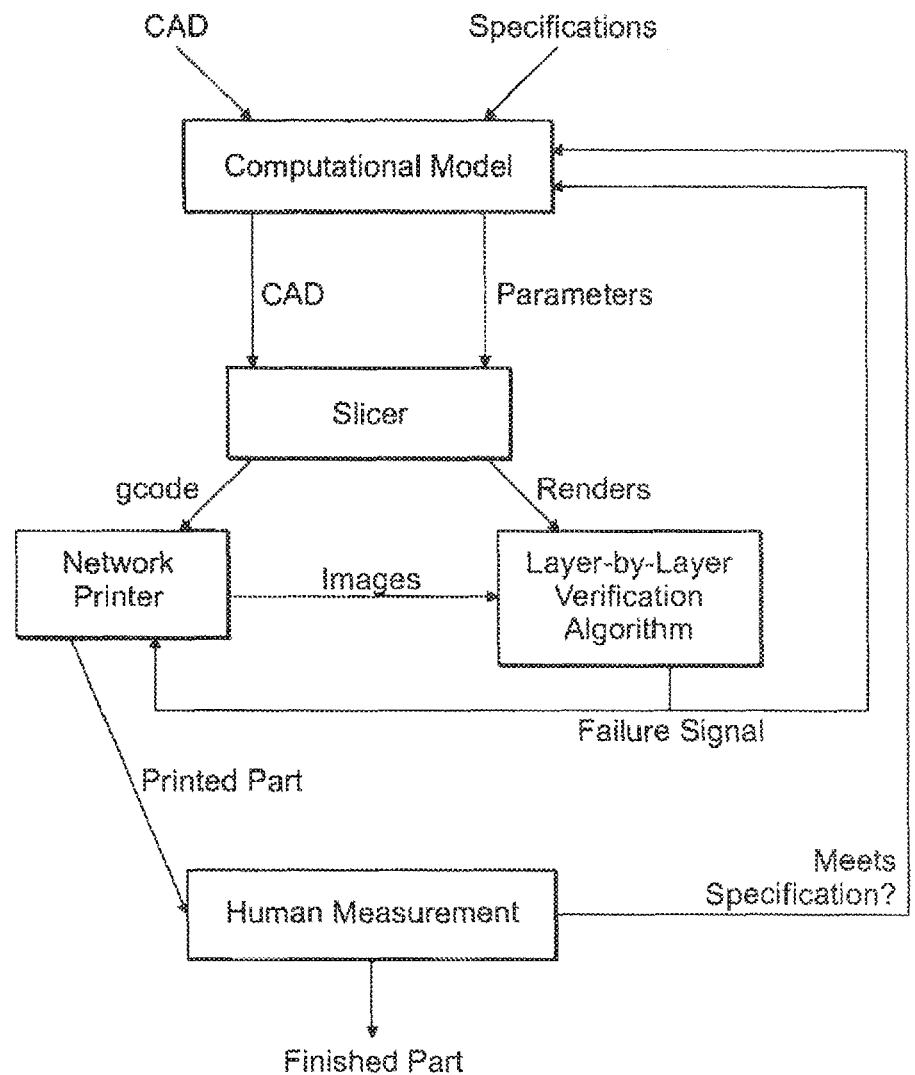
FIG. 5 is a flow diagram for the automated process control with layer-by-layer verification according to an embodiment of the invention.

FIG. 4 shows an overall system diagram. This figure shows both the remote and local aspects of the system. FIG. 5 illustrates the automated process control of the invention with layer-by-layer verification.

What is claimed is:

1. System for automated process control of an additive manufacturing device comprising:
   an additive manufacturing device for making an object;
   a local networked computer controlling the device;
   an array of lights illuminating a manufacturing volume of the device for creating object shadows for reconstructing a profile view from the point of view of each light in the array of lights;
   at least one camera with a view of the manufacturing volume of the device to generate network accessible images of the object;
   a layer-by-layer verification is used to detect errors on the images of the object during a printing process, wherein layer-by-layer verification using a slicer to generate a predictive render of the object after each layer is printed;
   wherein the local networked computer is programmed to stop the manufacturing process automatically identifying the object is defective based on the layer-by-layer verification of the images of the object.

2. The system of claim 1 wherein the at least one camera has a fixed view of the manufacturing volume.

3. The system of claim 1 wherein the at least one camera has a robotically controlled view of the manufacturing volume.

4. The system of claim 1 wherein the images are video streams.

5. The system of claim 1 wherein the images are static.

6. The system of claim 1 wherein the additive manufacturing device is a three-dimensional printer.

7. The system of claim 1 wherein the computer further includes a series of server-side applications executing remote algorithms.

8. The system of claim 1 further including a web-browser based control interface.

9. The system of claim 7 wherein the algorithm includes machine learning algorithms.

10. The system of claim 9 wherein the machine learning algorithms include markov, bayesian inference or artificial neural network algorithms.

11. The system of claim 1 wherein the manufacturing volume includes a calibration pattern thereon.

12. The system of claim 1 further including three-dimensional print preview to update object rendering in real time.

13. The system of claim 1 wherein the images of the object are used for layer-by-layer verification using a renderer to generate the predictive render of what the object will look like after each layer is printed.

14. The system of claim 13 wherein the renderer takes as input the same geometry (triangle mesh) as a toolpath generator.

15. The system of claim 14 wherein the renderer takes as additional input slicing parameters including layer height, infill pattern and density.

16. The system of claim 13 wherein the renderer takes as input a toolpath that is used to print the object.

17. The system of claim 14, 15, or 16 further including calibration image(s) of a blank print surface at a variety of heights to improve the accuracy of the render and/or to isolate the relevant sections of the images of the object from each layer.

* * * * *